United States Patent
Miyagi et al.

[11] Patent Number: 5,995,696
[45] Date of Patent: Nov. 30, 1999

[54] HOLLOW WAVEGUIDE AND METHOD OF MAKING SAME

[75] Inventors: Mitsunobu Miyagi, Miyagi; Akihito Hongo, Ibaraki, both of Japan

[73] Assignees: Hitachi Cable, Ltd., Tokyo, Japan; Mitsunobu Miyagi, Miyagi-ken, Japan

[21] Appl. No.: 08/990,751

[22] Filed: Dec. 15, 1997

[30] Foreign Application Priority Data

Feb. 7, 1997 [JP] Japan ................................. 9-025533
Jul. 9, 1997 [JP] Japan ................................. 9-183393

[51] Int. Cl.$^6$ ............................................ G02B 6/20
[52] U.S. Cl. ................. 385/125; 427/163.2; 427/230; 427/235; 427/239; 427/419.8
[58] Field of Search ................................ 385/123, 125; 65/393; 427/163.2, 230, 235, 238, 239, 404, 419.1, 419.2, 419.7, 419.8, 430.1, 434.5

[56] References Cited

U.S. PATENT DOCUMENTS

| | | | |
|---|---|---|---|
| 4,930,863 | 6/1990 | Croitoriu et al. | 385/125 |
| 5,325,458 | 6/1994 | Morrow et al. | 385/125 |
| 5,394,501 | 2/1995 | Baumeister et al. | 385/125 |
| 5,440,664 | 8/1995 | Harrington et al. | 385/125 |
| 5,567,471 | 10/1996 | Harrington et al. | 427/163.2 |
| 5,574,100 | 11/1996 | Sagane et al. | 525/75 |
| 5,729,646 | 3/1998 | Miyagi et al. | 385/125 |

*Primary Examiner*—John D. Lee
*Attorney, Agent, or Firm*—McDermott, Will & Emery

[57] ABSTRACT

A solution of a metallic compound or a cyclic olefin polymer is introduced into a metallic pipe to deposit the solution onto the whole inner wall of the metallic pipe followed by heat treatment at a high temperature to dry and solidify the solution, thereby forming a dielectric layer. Thus, a metallic hollow waveguide is prepared which comprises a metallic pipe, a dielectric layer provided on the inner wall of the pipe, and a hollow region defined by the inner wall of the dielectric layer. The above constitution makes it possible to provide a highly reliable hollow waveguide which is usable in a broad waveband, for which a quartz optical fiber is unusable, causes no significant transmission loss, can be mass produced, and can be easily produced in a reduced diameter and in an increased length, and to provide a method of making the same.

15 Claims, 7 Drawing Sheets

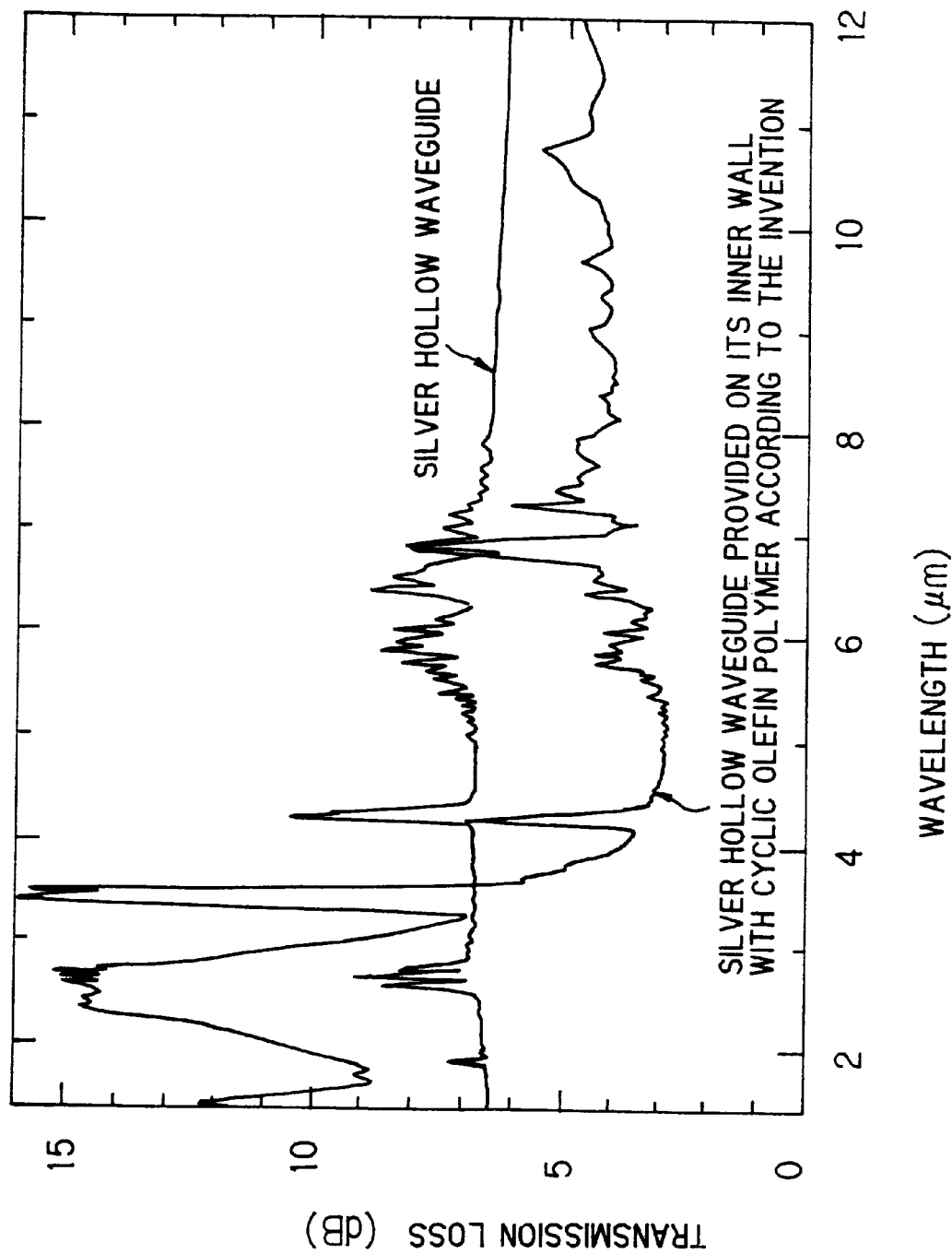

HOLLOW WAVEGUIDE AND METHOD OF MAKING SAME

FIELD OF THE INVENTION

The present invention relates to a hollow waveguide which can transmit light in a broad waveband, i.e., not only light in visible region but also infrared waveband untransmittable by a quartz optical fiber and particularly to a flexible hollow waveguide suitable for transmission of various laser beams useful in medical treatment, industrial machining, measurement, analysis, chemistry, and other fields, and a method of making the same.

BACKGROUND OF THE INVENTION

An infrared radiation having a wavelength of not less than 2 $\mu$m is used in medical treatment, industrial machining, measurement, analysis, chemistry, and other various fields. In particular, an Er-YAG laser with a wavelength of 2.94 $\mu$m, a CO laser with a wavelength of 5 $\mu$m, and a $CO_2$ laser with a wavelength of 10.6 $\mu$m have high oscillation efficiency to provide high output and, at the same time, have large absorption for water, rendering these lasers important as light sources for medical/surgical treatment equipment and industrial working.

Conventional quartz optical fibers for communication, when used with a laser beam having a wavelength of not less than 2 $\mu$m, causes large infrared absorption derived from the molecular vibration, resulting in high loss. For this reason, the quartz optical fibers cannot be used as waveguides for transmitting these laser beams. This has led to energetic research and development of new type of optical waveguides for infrared waveband usable in a wide range of applications.

Waveguides, for infrared radiation with a wavelength of not less than 2 $\mu$m, which are currently under research and development are classified roughly into solid type, that is, infrared fibers, and hollow waveguides.

Materials for infrared fibers are classified into heavy metal oxide glasses (for example, $GeO_2$ and $GeO_2$—$Sb_3O_3$), chalcogenide glasses (for example, As—S and As—Se), and halides. The halides are further classified into halide glasses (for example, $ZnCl_2$ and $CdF_3$—$BaF_2$—$ZrF_4$) and crystalline metal halides (for example, KRS5, AgCl, AgBr, and KCl).

Also for the hollow waveguide, various waveguides different from one another in structure, material and shape have been proposed and produced on an experimental basis. Among others, a metallic hollow waveguide, with a dielectric provided on the inner wall thereof, comprising a high reflective coating provided on the inner wall of a metallic pipe, has been proposed for application to laser machining of high power transmission, and a waveguide having a structure comprising a thin layer of germanium, zinc sulfide or the like formed on the inner wall of a pipe of a metal, such as nickel, has been produced on an experimental basis.

The above hollow waveguide is produced as follows. At the outset, a thin layer of an inorganic material, permeable to infrared radiation, such as germanium or zinc sulfide, is formed by sputtering method on the outer periphery of a base pipe of aluminum or the like which can be etched. Further, a thick nickel layer is formed by electroplating method on the outer periphery of the thin layer of the inorganic material. Finally, the base pipe is removed by chemical etching. Interposition of a thin layer of silver between the thin layer of germanium or zinc sulfide and the thick layer of nickel for ensuring the mechanical strength enables of the preparation of a waveguide with a lower loss.

Up to now, the above construction has realized a transmission loss of 0.05 dB/m and a transmission capacity of 3 kW and has been found to transmit energy required for cutting and welding of metal plates. As compared with the solid type infrared fiber, this hollow waveguide is less likely to cause reflection of the radiation at the time of entry into and emergence from the waveguide and is excellent in cooling effect, rendering the hollow waveguide suitable for transmission of high power infrared radiation.

On the other hand, also in the ultraviolet region, there is a light source, such as an excimer laser, which is important in laser chemistry. Solid type optical fibers, however, cause, in a shorter wavelength, an extreme increase in loss derived from Rayleigh scattering and hence cannot be used as a waveguide. For this reason, research and development of a waveguide for the ultraviolet region has hardly been made in the art.

Solid type optical fibers for use in infrared wavelength region generally have high refractive index, resulting in large reflection loss, and hence are disadvantageous for transmission of high power infrared radiation. In particular, the above conventional glass optical fiber generally has low melting or softening point, and slight loss is likely to cause damage to the end face of the optical fiber. Further, in most cases, the transmission region is in the range of up to 6 or 7 $\mu$m, making it difficult to transmit $CO_2$ laser light. For some crystalline infrared fibers, the transmission region reaches 10.6 $\mu$m, a waveband of $CO_2$ laser. They, however, are likely to cause plastic deformation upon repeated bending and are largely deliquescent, posing a problem of long-term reliability.

The conventional method for making a hollow waveguide provided on its inner wall with germanium, zinc sulfide or the like is complicate and unsuitable for mass production of the hollow waveguide and, further, cannot easily reduce the diameter or increase the length of the hollow waveguide. For the metallic hollow waveguide provided on its inner wall with a dielectric using germanium, zinc sulfide or the like, since the thin layer as the inner layer is formed by sputtering method, the length of the hollow waveguide depends upon the apparatus used for the production of the waveguide and, in the case of actual waveguides, is several meters at the longest. The inner diameter of the waveguide is the outer diameter of the pipe as the base material which is removed by etching in the final step. The pipe as the base material should be completely removed, and, hence, the inner diameter of the waveguide cannot be made very small. At the present time, the smallest possible diameter of the waveguide is about 1 mm. The larger the diameter of the waveguide, the lower the mechanical bendability and the higher the bending loss. Further, a laser beam of more high order modes is propagated, posing a problem of deteriorated focusing properties.

In the ultraviolet waveband, as described above, solid type optical fibers cause, in a shorter wavelength, an extreme increase in loss derived from Rayleigh scattering, and, hence, research and development of a waveguide for the ultraviolet region has hardly been made in the art. Waveguides having a hollow structure, in which Rayleigh scattering is negligible, are considered as a promising waveguide for transmission of ultraviolet light.

SUMMARY OF THE INVENTION

According, an object of the present invention is to provide a hollow waveguide which causes no significant loss in light having a waveband untransmittable by a quartz optical fiber, is suitable for mass production, can be easily produced in an increased length or a reduced diameter, and has excellent long-term reliability, and to provide a method of making the same.

According to the first feature of the invention, a hollow waveguide, comprises: a tubular member constituting a waveguide; and a dielectric provided on the inner wall of the tubular member and transparent to a waveband of light to be transmitted, the dielectric being composed mainly of an inorganic compound prepared by heat-treating a metallic compound solution at a high temperature to dry and solidify the metallic compound solution and heat-decomposing the organic component.

According to the second feature of the invention, a hollow waveguide, comprises: a tubular member constituting a waveguide; and a dielectric provided on the inner wall of the tubular member, the dielectric comprising a cyclic olefin polymer transparent to a waveband of light to be transmitted.

In the above hollow waveguide, preferably, the metallic compound solution comprises a metal alkoxide compound dissolved in and diluted with an alcohol or an ester organic solvent, and the dielectric is composed mainly of a metal oxide selected from the group consisting of $SiO_2$, $Al_2O_3$, $TiO_2$, $ZnO_2$, $MgO$, $ZrO_2$, $CeO_2$, $SnO_2$, and $Y_2O_3$, the metal oxide being in a single oxide form or a composite oxide form, is composed mainly of zinc sulfide (ZnS) synthesized by a reaction of an zinc alkoxide with hydrogen sulfide ($H_2S$), is composed mainly of zinc selenide (ZnSe) synthesized by a reaction of an zinc alkoxide with hydrogen selenide ($H_2Se$), is composed mainly of zinc sulfide prepared by heat-decomposing a precursor, the precursor having been is prepared by mixing zinc chloride ($ZnCl_2$) with thiourea ($S:C(NH_2)_2$) in an alcohol, or is composed mainly of zinc selenide prepared by heat-decomposing a precursor, the precursor having been prepared by mixing zinc chloride ($ZnCl_2$) with selenourea ($Se:C(NH_2)_2$) in an alcohol. The zinc alkoxide may be zinc dimethoxide ($Zn(OCH_3)_2$), zinc diethoxide ($Zn(OC_2H_5)_2$), zinc di-n-propoxide ($Zn(OnC_3H_7)_2$), zinc di-n-butoxide ($Zn(OnC_4H_9)_2$), or zinc tetra-n-butoxide ($Zn(OnC_4H_9)_4$).

The cyclic olefin polymer is preferably a noncrystalline cyclic olefin polymer prepared by heat-treating a polymer solution prepared from norbornene, dicyclopentadiene, or tetracyclododecene.

The tubular member may be a metallic pipe or made of phosphor bronze or stainless steel. Alternatively, it may be a nonmetallic pipe or made of a fluororesin or quartz glass. The metallic or nonmetallic pipe may have such a construction that a metallic thin layer formed of a metallic material different from the metal constituting the metallic pipe is provided on the inner wall of the metallic or nonmetallic pipe. The metallic thin layer may be formed by coating gold, silver, molybdenum, or nickel. Visible light and infrared radiation having a wavelength of not less than 2 $\mu$m can be allowed to enter the hollow waveguide constructed in this way, that is, the hollow region surrounded by the tubular member, in a superimposed state or while switching the entry of the visible light to the entry of the infrared radiation or vice versa. Air, nitrogen, or carbon dioxide gas may be introduced into and passed through the hollow region in the tubular member.

According to the third feature of the invention, a method of making a hollow waveguide comprises the steps of: providing a tubular member for constituting a waveguide; introducing an organometal compound solution into the tubular member to deposit the solution onto the whole inner wall of the tubular member; discharging the extra solution from the interior of the tubular member; heat-treating the tubular member at a high temperature while introducing a predetermined gas into the tubular member and passing the gas through the tubular member; and drying and solidifying the solution, deposited on the whole inner wall region, by the heat treatment at a high temperature to form a dielectric layer.

According to the fourth feature of the invention, a method of making a hollow waveguide comprises the steps of: providing a tubular member for constituting a waveguide; introducing a solution of a dissolved zinc alkoxide into the tubular member to deposit the zinc alkoxide solution onto the whole inner wall of the tubular member; discharging the extra solution from the interior of the tubular member; heat-treating the tubular member at a high temperature while introducing hydrogen sulfide gas into the tubular member and passing the hydrogen sulfide gas through the tubular member; and drying and solidifying the solution, deposited on the whole inner wall region, by the heat treatment at a high temperature to form a dielectric layer of zinc sulfide.

According to the fifth feature of the invention, a method of making a hollow waveguide comprises the steps of: providing a tubular member for constituting a waveguide; introducing a solution of a dissolved zinc alkoxide into the tubular member to deposit the zinc alkoxide solution onto the whole inner wall of the tubular member; discharging the extra solution from the interior of the tubular member; heat-treating the tubular member at a high temperature while introducing a hydrogen selenide gas into the tubular member and passing the hydrogen selenide gas through the tubular member; and drying and solidifying the solution, deposited on the whole inner wall region, by the heat treatment at a high temperature to form a dielectric layer of zinc selenide.

According to the sixth feature of the invention, a method of making a hollow waveguide comprises the steps of: providing a tubular member for constituting a waveguide; introducing a precursor solution, prepared by mixing zinc chloride with thiourea in an alcohol, into the tubular member to deposit the precursor solution onto the whole inner wall of the tubular member; discharging the extra solution from the interior of the tubular member; heat-treating the tubular member at a high temperature while introducing a gas into the tubular member and passing the gas through the tubular member; and drying and solidifying the solution, deposited on the whole inner wall region, by the heat treatment at a high temperature to form a dielectric layer of zinc sulfide.

According to the seventh feature of the invention, a method of making a hollow waveguide comprises the steps of: providing a tubular member for constituting a waveguide; introducing a precursor solution, prepared by mixing zinc chloride with selenourea in an alcohol, into the tubular member to deposit the precursor solution onto the whole inner wall; discharging the extra solution from the interior of the tubular member; heat-treating the tubular member at a high temperature while introducing a gas into the tubular member and passing the gas through the tubular member; and drying and solidifying the solution, deposited on the whole inner wall region, by the heat treatment at a high temperature to form a dielectric layer of zinc selenide.

According to the eighth feature of the invention, a method of making a hollow waveguide comprises the steps of: providing a tubular member for constituting a waveguide; introducing a solution of a cyclic polyolefin polymer into the tubular member to deposit the solution onto the whole inner wall of the tubular member; discharging the extra solution from the interior of the tubular member; heat-treating the tubular member at a high temperature while introducing a predetermined gas into the tubular member and passing the gas through the tubular member; and drying and solidifying the solution, deposited on the whole inner wall region, by the heat treatment at a high temperature to form a dielectric layer.

In the above methods of making a hollow waveguide, preferably, the formation of the dielectric layer is repeated until the thickness reaches a desired one. The organometallic compound solution or the cyclic polyolefin polymer solution may be introduced into and discharged from the tubular member by suction by means of a vacuum pump, force feed by a high pressure gas, or utilization of the gravitation of the solution.

In the method of making a hollow waveguide according to the present invention, a solution of an organometallic compound or a cyclic polyolefin polymer is directly filled into and coated on the inner wall of a metallic pipe having a hollow structure or the inner wall, of a pipe, coated with a metallic thin layer, and the coating is heat-treated at a high temperature to dry and solidify the coating, thereby forming a dielectric layer on the inner wall of the pipe, permitting the thickness of the dielectric layer to be controlled with a good accuracy as desired by varying productions conditions, such as the number of repetitions of the steps of filling, discharge, and drying of the solution, the viscosity of the solution, the content of the solid matter, and the coating speed. Further, the method of making a hollow waveguide according to the present invention can be applied to the production of waveguides having excellent flexibility and small diameter, and, since the length of the waveguide does not depend upon the apparatus for making the waveguide, can realize an increase in length of the waveguide.

The zinc alkoxide solution is prepared by reacting a zinc alkoxide, selected from zinc dimethoxide ($Zn(OCH_3)_2$), zinc diethoxide ($Zn(OC_2H_5)_2$), zinc di-n-propoxide ($Zn(OnC_3H_7)_2$), zinc di-n-butoxide ($Zn(OnC_4H_9)_2$), and zinc tetra-n-butoxide ($Zn(OnC_4H_9)_4$), with an amino alcohol to dissolve the zinc alkoxide.

BRIEF DESCRIPTION OF THE DRAWINGS

The invention will be explained in more detail in conjunction with appended drawings, wherein:

FIG. 7 is an explanatory view showing transmission loss characteristics of a hollow waveguide according to a second preferred embodiment of the present invention.

DESCRIPTION OF THE PREFERRED EMBODIMENTS

Figure 1:
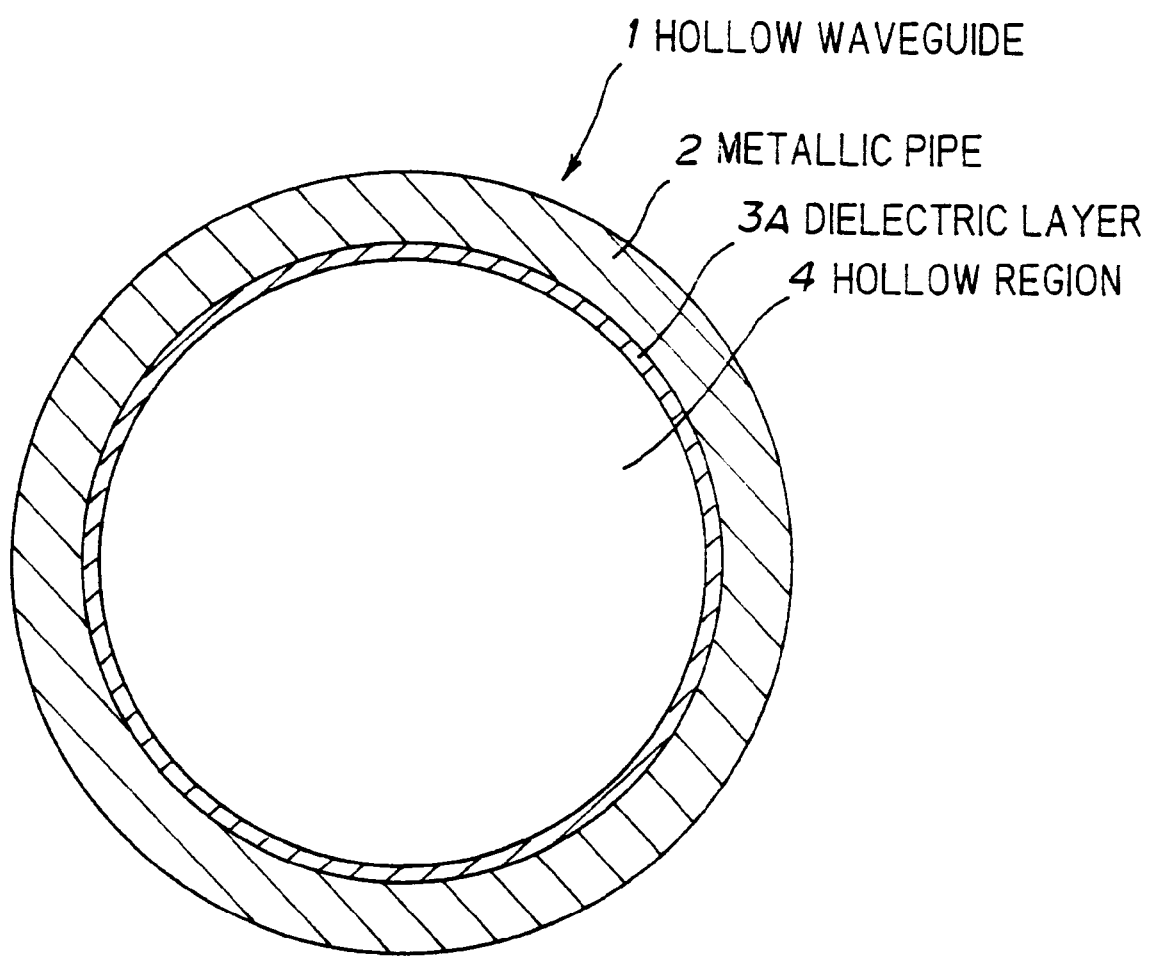
FIG. 1 is an explanatory view showing a hollow waveguide according to a first preferred embodiment of the present invention.

FIG. 1 shows a hollow waveguide 1 according to a first preferred embodiment of the present invention. The hollow waveguide 1 comprises: a metallic pipe 2; a dielectric layer 3A provided on the inner wall of the metallic pipe 2, the dielectric layer 3A comprising a material composed mainly of an inorganic compound; and a hollow region 4 provided on the inside of the dielectric layer 3A.

The dielectric layer 3A is formed by directly coating a solution of a metallic compound in a certain organic solvent onto the inner wall of a pipe, heat-treating the coating at a high temperature to dry and solidify the coating, and further heat-decomposing the organic component. According to the first preferred embodiment of the present invention, a solution of particularly a metal alkoxide dissolved in an alcohol or ester organic solvent is used for the formation of the dielectric layer 3A. Upon heat treatment at a high temperature, this undergoes reaction processes, such as hydrolysis and polymerization, and finally produces a metallic oxide as a transparent dielectric.

A laser beam, upon entry into the hollow waveguide 1, is repeatedly reflected in the interface of the hollow region 4 and the dielectric layer 3A and in the dielectric layer 3A and the metallic pipe 2, thus permitting the laser beam to be propagated through the hollow waveguide 1. In general, since the metallic material has a large coefficient of absorption for a laser beam transmitted through the waveguide, there is no possibility that the laser energy deeply enters the metallic layer. Therefore, for the metallic layer in contact with the dielectric layer 3A, a thickness greater than that of the skin depth suffices from the optical viewpoint.

The metallic pipe 2 is optically involved in the transmission characteristics and, at the same time, functions to maintain the mechanical strength of the hollow waveguide 1. Regarding the metal in contact with the dielectric layer 3A, the larger the absolute value of the complex index of refraction, the lower the loss. Therefore, for example, use of a metallic pipe 2 made of silver or gold is effective in lowering the loss of the waveguide. It, however, is unpractical from the viewpoints of economy and mechanical properties.

Further, a thick-wall metallic pipe, which is inexpensive and has excellent mechanical strength, provided on its inner wall with a thin layer of a metallic material different from the metallic material constituting the pipe may be used as the metallic pipe 2. Pipes satisfying these requirements include phosphor bronze pipes having a high coefficient of thermal conductivity and excellent mechanical bending properties and stainless pipes which are inexpensively available as chemical stable pipes with the surface roughness of the inner wall being small. Gold, silver, or copper, of which the absolute value of the complex index of refraction is particularly large, or molybdenum which is hard and is less likely to be scratched, is favorable as the metallic thin layer to be formed on the inner wall of the metallic pipe.

Some inorganic metallic compounds prepared from metallic compounds solved in organic solvent as a starting compound have low refractive index and are transparent to a wide region, i.e., wavelengths ranging from ultraviolet to infrared. An absorption peak inherent in the material attributable to a carbon bond is absent is in the inorganic metallic compound. Such an absorption peak is in many cases observed in an infrared region. When organic materials are used as the dielectric material to be provided on the inner wall of the pipe, it is necessary to select such a material that the absorption peak inherent in the material is not coincident with the oscillation wavelength of a laser beam source (for example, Er-YAG laser, CO laser, or $CO_2$ laser). In such selection, as compared with organic dielectric materials, an inorganic dielectric material composed mainly of a metallic compound generally has low loss in a broader infrared region and a higher degree of freedom for the selection of the material.

Inorganic metallic compounds, as compared with bulk germanium, zinc sulfide or the like obtained, in general, by liquid phase growth or vapor phase growth, has a larger coefficient of absorption in the infrared region. For the hollow waveguide, unlike the solid type optical fiber, the energy mostly focuses on the hollow region 4 where the laser energy to be transmitted is hardly lost, while only a very low proportion of the energy is absorbed into the dielectric layer 3A. Therefore, the influence of very low loss in the dielectric layer 3A on the transmission loss of the waveguide is very small.

In the metallic hollow waveguide with a dielectric layer provided on inner wall thereof, it is theoretically disclosed that the closer the refractive index of the thin layer of a dielectric to be provided on the inner wall of waveguide to √2, the lower the transmission loss (A. Hongo, K. Morosawa, T. Shirota, Y. Matsuura, and M. Miyagi, IEEE J. Quantum Electron, vol. 26, 1510, 1990). Germanium and zinc sulfide, which have hitherto been used in the art, respectively have refractive indexes of 4 and 2.3, whereas some metallic compounds usable in the present invention have lower refractive index. Use of such materials having low refractive index can realize a waveguide having lower loss and, at the same time, can broaden the acceptable thickness range for the thin layer to be provided on the inner wall of the waveguide, facilitating the production of the waveguide.

Specific examples of material usable in the present invention include $SiO_2$, $Al_2O_3$, $TiO_2$, ZnO, MgO, $ZrO_2$, $CeO_2$, $SnO_2$, and $Y_2O_3$, these metal oxides being in a single oxide form or a composite oxide form. The above metallic oxides are excellent in optical properties, as well as in mechanical properties and heat resistance. For $SiO_2$, $Al_2O_3$, MgO, and $Y_2O_3$, the refractive index in the infrared region is smaller than 2, and the remaining metallic oxides also have a refractive index of less than 2.5. Further, these metallic oxides are transparent to 2.94 μm, oscillation wavelength of Er-YAG laser. In particular, $TiO_2$, $CeO_2$, and $Y_2O_3$ are transparent also to longer waveband and hence applicable also to waveguides for $CO_2$ laser oscillated at 10.6 μm.

Further, these metallic oxides have high heat resistance. As described above, the amount of laser energy which is transmitted through the dielectric layer provided on the inner wall of the waveguide is small. Since, however, the absorbed laser energy is entirely converted to thermal energy, the heat resistance is an important property particularly as in the waveguide of the present invention through which high laser energy is transmitted. The thin layer of a metallic oxide provided as a dielectric layer on the inner wall of the waveguide causes neither heat deformation nor heat decomposition and, hence, does not evolve any harmful material.

In the hollow waveguide 1 shown in FIG. 1, a nonmetallic pipe coated with a metallic layer may be used instead of the metallic pipe 2. Particularly preferred nonmetallic pipes include fluororesin pipes and quartz glass pipes. The fluororesin pipes possess excellent flexibility and chemical resistance. On the other hand, the quartz glass pipes possess excellent heat resistance and chemical resistance and, in addition, have very small surface roughness in the inner wall, resulting in lowered transmission loss. The mechanical strength of the glass pipe can be dramatically improved by coating a resin on the external surface of the glass pipe. In this case, however, the heat treatment temperature of the organometallic compound should be such that the nonmetallic pipe serving to maintain the mechanical strength is not heat decomposed upon exposure to a high temperature.

As described above, gold, silver, or copper, of which the absolute value of the complex index of refraction is particularly large, or molybdenum which is hard and is less likely to be scratched, is favorable as the metallic layer coated onto the inner wall of the nonmetallic pipe. A single layer of the above metal suffices for satisfactory optical properties. For example, however, interposition of a nickel layer between the nonmetallic pipe and the above metallic layer can enhance the adhesion of the metallic layer to the nonmetallic pipe. The nickel layer can be easily formed by allowing an electroless nickel plating solution to flow into the nonmetallic pipe and discharging the plating solution from the nonmetallic pipe.

According to the first preferred embodiment of the present invention, the thickness of the metallic layer coated onto the inner wall of the metallic pipe 2 is not more than 50 μm. A thickness greater than the skin depth suffices for satisfactory results. When the thickness is excessively large, the adhesion is lowered due to the internal stress of the metallic layer and a difference in coefficient of linear expansion.

The hollow waveguide 1 transmits therethrough visible light of He—Ne laser or the like in a superimposed state or while switching. This is effective in safely applying an invisible laser beam to an object. Further, a dried gas, such as air, nitrogen, or carbon dioxide gas, may be introduced into and passed through the waveguide. The dried gas prevents the entry of dust or water into the interior of the waveguide and, in addition, cools the waveguide which has generated heat upon absorption of the laser energy. In the medical field, the above gas should be sprayed simultaneously with the laser beam irradiation to the affected part. In this case, the gas may be introduced by utilizing the hollow structure of the waveguide.

Figure 2:
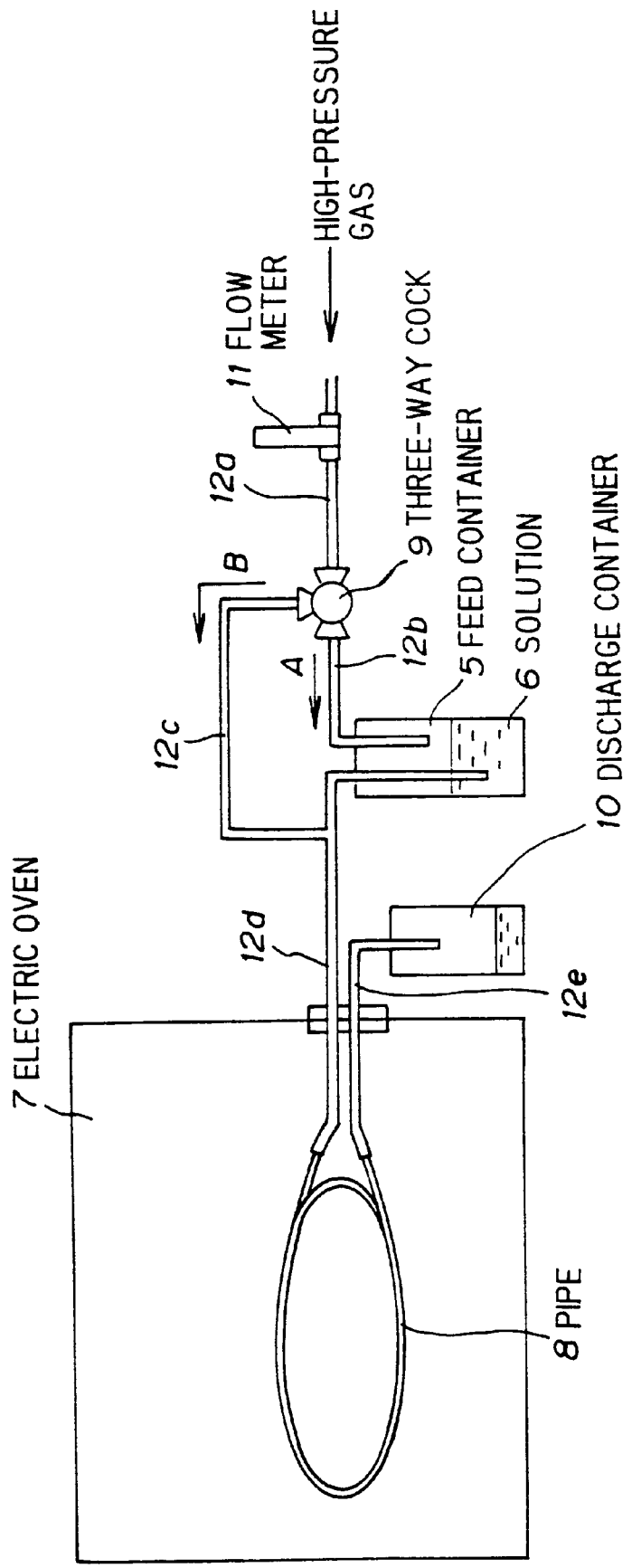
FIG. 2 is an explanatory view showing an apparatus for making a hollow waveguide according to a first preferred embodiment of the present invention.

FIG. 2 shows an apparatus for making the hollow waveguide 1. This apparatus comprises a feed container 5 containing a solution 6 of an organometallic compound, an electric oven 7 for heat-treating a pipe 8 to be served as a waveguide, a three-way cock 9 for switching the passage of a high-pressure gas for introduction of the solution 6 into the pipe 8, a discharge container 10 for discharging the solution 6 of an organometallic compound introduced into the pipe 8, a flowmeter 11 for regulating the flow rate of the high-pressure gas, and pipings 12a, 12b, 12c, 12d, and 12e connecting the pipe 8, the three-way cock 9, the discharge container 10, and the flowmeter 11 to one another.

The solution 6, may be, for example, one prepared by dissolving an organic compound of a metal alkoxide in an organic solvent, such as an alcohol or an ester, or by diluting the organic compound with the organic solvent (one example thereof is MOD coating material manufactured by Kojundo Chemical Laboratory Co., Ltd.). The metal alkoxide may be applied to various metallic compounds, and the solid content or formulation thereof can be easily regulated. The pipe 8 accommodated in the electric oven 7 is a stainless capillary having an inner diameter of 700° C. and an outer diameter of 800° C. of which the inner wall is polished and then coated with a thin silver layer. This pipe is accommodated in a coil form to cope with a demand for an increase in length. As described above, a nonmetallic pipe coated on its inner wall with a metallic layer may also be used as the pipe 8.

The step of providing a dielectric layer on the inner wall of the pipe will be described.

At the outset, the organometallic compound solution 6 is forced out from the feed container 5 a high-pressure gas which is allowed to flow in a direction A through the three-way cock 9 and introduced into the pipe 8 and discharged from the pipe 8 into the discharge container 10. After a given amount of the organometallic compound solution 6 is discharged into the discharge container 10, the passage of the high-pressure gas is switched from the direction A to the direction B by means of the three-way cock 9.

The internal temperature of the electric oven 7 is kept at 150 to 200° C., and, upon flow of the high-pressure gas into the pipe 8, the organometallic compound coated onto the inner wall of the pipe 8 is instantaneously dried and solidified.

The thickness of the thin layer of a metal oxide provided on the inside of the pipe 8 depends upon the coating speed besides the solid content. The coating speed may be controlled by regulating the flow rate of the high-pressure gas while monitoring the flowmeter 11. The high-pressure gas is introduced into and passed through the pipe 8 for a predetermined period of time so that drying can be satisfactorily performed. In the present embodiment, an $O_2$ gas, which accelerates the oxidation and stabilizes the layer thickness, and a helium gas having a high coefficient of thermal conductivity were used as the high-pressure gas.

Switching of the three-way cock 9 is repeatedly performed until the thickness of the thin layer of a metallic oxide provided on the inner wall of the pipe 8 reaches a desired one. Finally, the coated pipe 8 is heated for about one hr in the electric oven 7 set at about 450° C. to completely dry the coating, thereby completing a hollow waveguide having on its internal wall a thin layer of a metallic oxide. The thin layer of a metallic oxide is composed mainly of an inorganic compound scattered by the heat decomposition of organic matter and hence possesses excellent heat resistance and moisture resistance.

In FIG. 2, a high-pressure gas is fed from the feed side in order to introduce the solution 6 into the pipe 8 and to discharge the solution 6 from the pipe 8. Alternatively, the solution 6 may be introduced into the pipe 8 by mounting a vacuum pump on the discharge side and performing suction.

In the present embodiment, the metallic compound provided on the inner wall of the pipe 8 is one prepared from a metal alkoxide. So far as the solid content and the formation can be easily regulated, various materials including a single metal oxide selected from $SiO_2$, $Al_2O_3$, $TiO_2$, ZnO, MgO, $ZrO_2$, $CeO_2$, $SnO_2$, and $Y_2O_3$ or a composite metal oxide thereof may be selected by using metal alkoxides as the starting material under substantially the same conditions.

Figure 3:
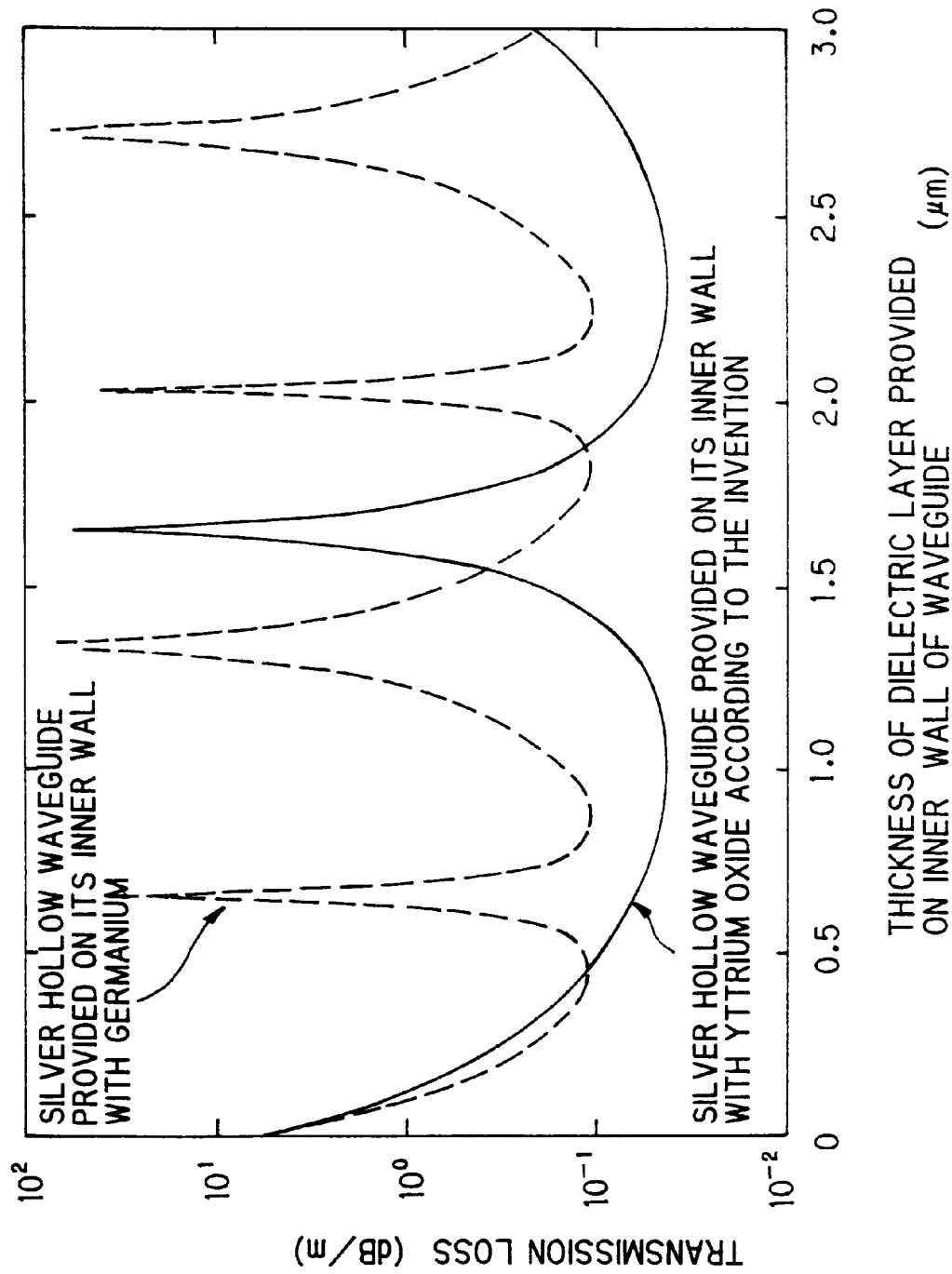
FIG. 3 is an explanatory view showing transmission loss characteristics of a hollow waveguide according to a first preferred embodiment of the present invention.

In FIG. 3, the relationship between the transmission loss and the thickness of a dielectric using a metal oxide, particular $Y_2O_3$, provided on the inner wall of a silver hollow waveguide, that is, a thin layer of $Y_2O_3$, according to the present invention is shown as an example. The abscissa represents the layer thickness of the dielectric provided on the inner wall of the waveguide, and the ordinate represents the transmission loss of HE11 mode as a basic propagation mode. Further, for comparison, the transmission loss of the conventional silver hollow waveguide provided on its inner wall with germanium is also shown in FIG. 3. Light to be transmitted is $CO_2$ laser light having a wavelength of 10.6 μm.

As can be seen from FIG. 3, the refractive index of germanium is 4, whereas that of $Y_2O_3$ is as low as 1.87. Therefore, the minimum loss relative to the thickness of the thin layer provided on the inner wall of the waveguide in the silver hollow waveguide with a dielectric of $Y_2O_3$ provided on the inner wall thereof is reduced to about ⅓ of that in the conventional silver hollow waveguide with germanium provided on the inner wall thereof.

The transmission loss of the silver hollow waveguide with a dielectric provided on the inner wall thereof is periodically varied relative to the layer thickness of a metal oxide provided on the inner wall of the waveguide. In this case, provision of $Y_2O_3$ on the inner wall of the waveguide renders the variation in transmission loss mild, permitting the acceptable layer thickness range of the metal oxide in the course of production of the hollow waveguide to be broadened. Further, it is apparent that, in the transmission of $CO_2$ laser light, a $Y_2O_3$ layer thickness around 1 μm provides the minimum transmission loss. The optimal layer thickness varies depending upon the wavelength of the laser beam transmitted. Setting of an optimal layer thickness according to the wavelength of the laser beams transmitted can realize low-loss waveguides without limitation to the transmission of $CO_2$ laser beam shown in FIG. 3.

Figure 4:
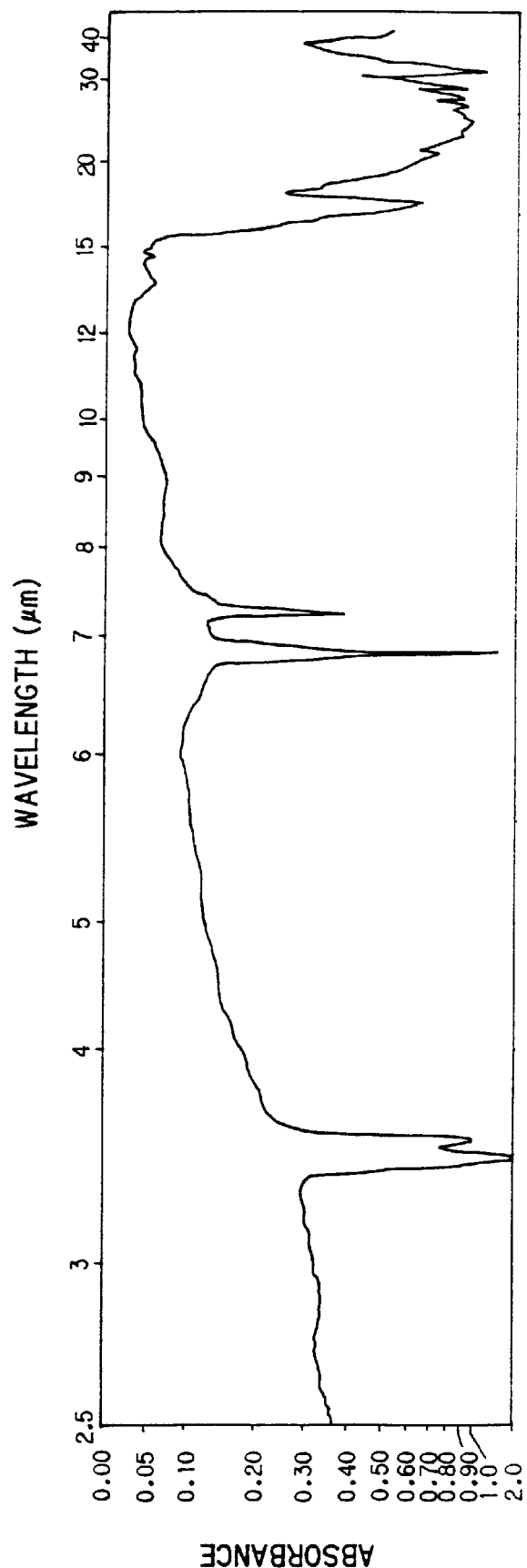
FIG. 4 is an explanatory view showing a curve for absorption characteristics of a hollow waveguide according to a first preferred embodiment of the present invention.

FIG. 4 shows a curve for absorption characteristics of $Y_2O_3$. Generally, metal oxides are different from one another in absorption loss at wavelenghs in the infrared region. It is apparent that $Y_2O_3$ has excellent transparency also to 10.6 μm, an oscillation wavelength of $CO_2$ laser. Further, in the curve for absorption characteristics, absorption peaks appear around wavelenghs 3.4 μm, 6.8 μm, and 7.2 μm and in a waveband of not less than 15 μm. In such wavebands as causing large absorption loss, provision of a thin layer of a dielectric is not effective in lowering the transmission loss of the waveguide. However, no absorption peak appears at 2.94 μm, 5 μm, and 10.6 μm, oscillation wavelengths of Er-YAG laser, CO laser, and $CO_2$ laser which are important light sources in the infrared region from the practical point of view. Therefore, laser beams in these wavelengths can be transmitted with low loss.

For example, when $SiO_2$ is selected as the material, the absorption loss is increased at a wavelength of not less than 5 μm, rendering $SiO_2$ unsuitable as the material for a waveguide for $CO_2$ laser oscillated at a wavelength of 10.6 μm. On the other hand, when the wavelength is not more than 3 μm, the absorption loss for $SiO_2$ is smaller than that for $Y_2O_3$. For this reason, in the case of a waveguide for Er-YAG laser oscillated at 2.94 μm, $SiO_2$ is more advantageous than $Y_2O_3$. Thus, suitably setting the material and layer thickness for the dielectric according to the wavelength of the laser beam transmitted results in the realization of a waveguide with low loss over a broad range of wavebands from the ultraviolet region to the infrared region. Further, various metal oxides other than $Y_2O_3$ are usable under the same process and conditions, broadening the degree of freedom in selecting the material.

As described above, the light transmitted through the waveguide is mostly propagated through the hollow region. In this case, the amount of the light absorbed into the dielectric layer composed mainly of an inorganic compound is so small that light transmission can be performed with low loss, and application to a small-diameter waveguide permits excellent flexibility to be imparted to the waveguide.

Further, a transparent dielectric layer of a metallic compound can be easily provided on the inner wall of a metallic hollow waveguide by introducing a solution of an organometallic compound into the hollow metallic waveguide, discharging the solution, and drying and solidifying the solution. The thickness of the dielectric layer can be controlled with a good accuracy as desired by varying productions conditions, such as the number of repetitions of the steps of filling, discharge, and drying of the solution, the viscosity of the solution, the content of the solid component, and the coating speed. Further, this method of making a hollow waveguide according to the present invention does not need any expensive production apparatus, can be applied to the production of waveguides having excellent flexibility and small diameter, and, since the length of the waveguide does not depend upon the apparatus for making the waveguide, can realize an increase in length of the waveguide.

As another preferred embodiment in FIG. 1, zinc sulfide or selenide is used as the dielectric layer 3A. The step of providing the dielectric layer 3A using zinc sulfide or zinc selenide will be described.

The zinc sulfide layer or zinc selenide layer to be served as the dielectric layer is synthesized by a reaction of the zinc alkoxide with hydrogen sulfide or hydrogen selenide.

In the apparatus for making a hollow waveguide shown in FIG. 2, a zinc alkoxide solution 6 is contained in the feed container 5. In this case, zinc tetra-n-butoxide was used as the zinc alkoxide. Besides zinc tetra-n-butoxide, zinc dimethoxide, zinc diethoxide, zinc di-n-propoxide, and zinc di-n-butoxide may be used in the same manner. In general, the zinc alkoxide is insoluble in most organic solvents. It, however, can be dissolved in an alcohol by a reaction with an amino alcohol, such as 2,2'-iminodiethanol (HN($CH_2CH_2OH$)$_2$), to form a certain complex. In the present embodiment, zinc tetra-n-butoxide was first suspended in ethanol, 2,2'-iminodiethanol was added to the suspension, and the mixture was thoroughly stirred at room temperature to prepare a colorless, transparent solution. Further, ethanol was added to regulate the concentration, and the resultant solution was used as a zinc alkoxide solution 6.

The pipe 8 accommodated in the electric oven 7 corresponds to the pipe 1 described above in connection with FIG. 1, and, as described above, either a metallic pipe or a metallic or nonmetallic pipe provided on its inner wall with a metallic thin layer is used. In the present embodiment, a stainless capillary having an inner diameter of 700 $\mu$m and an outer diameter of 800 $\mu$m was used as the metallic pipe. This stainless capillary in its inner surface is polished and coated with a thin layer of silver. The pipe 8 to be served as the waveguide can be easily coiled to increase the length thereof.

At the outset, the zinc alkoxide solution 6 is forced out from the feed container 5 through the piping 12b by means of a high-pressure gas which is allowed to flow in a direction A through the three-way cock 9 and introduced into the pipe 8 through the piping 12d, and a part of the solution 6 is deposited onto the inner wall of the pipe 8, while the remaining solution is discharged into the discharge container 10 through the piping 12e. After a given amount of the zinc alkoxide solution was discharged into the discharge container 10, the passage of the high-pressure gas is switched by means of the three-way cock 9 from the direction A to the direction B in which the piping 12c is connected. The internal temperature of the electric oven 7 is previously kept at about 150 to 200° C., and, upon flow of the high-pressure gas into the pipe 8, the zinc alkoxide solution coated onto the inner wall of the pipe 8 is instantaneously dried and solidified. The thickness of the thin layer provided on the inner wall of the pipe 8 depends upon the coating speed besides the solid content. A piping 12a for introducing a high-pressure gas is connected to the three-way cock 9, and the coating speed may be controlled by regulating the flow rate of the high-pressure gas using the flowmeter 11 provided in the course of the piping 12a. In this case, a high-pressure gas is allowed to flow into the pipe 8 for a given period of time so that drying can be satisfactorily performed. In the present embodiment, a helium gas having a high coefficient of thermal conductivity was used as the high-pressure gas.

The step of introducing the zinc alkoxide solution into the pipe 8 and the step of introducing the high-pressure gas are repeated by switching the three-way cock 9 until the thickness reaches a desired one. Finally, the coated pipe 8 is fully dried for about one hr in an electric oven 7 reset at about 450° C. while introducing a hydrogen sulfide gas, a hydrogen selenide gas, or a mixed gas composed of a hydrogen sulfide gas or a hydrogen selenide gas diluted with a helium gas. Thus, a hollow waveguide comprising a thin layer of zinc sulfide or zinc selenide provided on the inner wall of a pipe 8 is prepared.

In the embodiment shown in FIG. 2, a high-pressure gas is fed from the feed side in order to introduce the zinc alkoxide solution 6 into the pipe 8. Alternatively, regarding the method for introducing the zinc alkoxide solution 6, besides use of the high-pressure gas on the feed side, it is also possible use a method wherein a vacuum pump is used on the discharge side to permit the zinc alkoxide solution 6 to be introduced into the pipe 8 by suction.

In the above step of providing a dielectric layer on the inner wall of the waveguide, a thin layer of zinc sulfide or zinc selenide synthesized by a reaction of a zinc alkoxide with hydrogen sulfide or hydrogen selenide was used. Alternatively, a dielectric layer of zinc sulfide or zinc selenide may be prepared by heat-decomposing a precursor material prepared by mixing zinc chloride with thiourea or selenourea in an alcohol. The production process of the dielectric layer will be described.

At the outset, zinc chloride and thiourea are mixed together in an atomic ratio of Zn:S=1:1 in a production equipment shown in FIG. 2. An excessive amount of methanol was further added thereto to regulate the concentration of zinc chloride and thiourea so that the concentration of zinc chloride and thiourea was about 20% by weight in terms of ZnS. The precursor solution thus prepared was introduced into the stainless capillary to be served as the waveguide and discharged from the stainless capillary in the same manner as described above in connection with the production process, thereby depositing the solution onto the inner wall of the stainless capillary. As described above, the stainless capillary in its inner surface is previously polished and coated with a thin layer of silver. Subsequently, the precursor solution coated onto the inner wall of the pipe is dried and solidified in an electric oven kept at about 350° C. while introducing a helium gas into the stainless capillary. The step of introducing the precursor solution into the stainless capillary and the step of introducing a helium gas into the stainless capillary are repeated until the coating thickness reaches a desired one. Finally, the coated stainless capillary is fully dried at about 450° C. for about one hr. Thus, a hollow waveguide comprising a thin layer of zinc sulfide provided on the inner wall of the stainless capillary is prepared. When a thin layer of zinc selenide is provided, instead of the thin layer of zinc sulfide, on the inner wall of the stainless capillary, selenourea is used instead of the thiourea as the precursor solution.

The thin layer of zinc sulfide or zinc selenide thus formed possesses very high heat resistance and moisture resistance because organic matter is transpired by heat decomposition causing the thin layer to be composed mainly of an inorganic compound.

The function of the hollow waveguide provided on its inner wall with zinc sulfide or zinc selenide will be described.

A hollow waveguide provided on its inner wall with zinc sulfide, which has been experimentally produced with a view to transmitting a $CO_2$ laser beam having a wavelength of 10.6 $\mu$m, will be described as an example.

When this hollow waveguide is compared with the silver hollow waveguide on its inner wall with germanium, it is apparent that the refractive index of germanium is 4, whereas that of zinc sulfide is as low as about 2.2. Therefore, the transmission loss of the hollow waveguide provided on its inner wall with zinc sulfide is reduced to about ½ of that for the conventional hollow waveguide provided on its inner wall with germanium. The transmission loss is periodically varied relative to the thickness of the thin layer provided on the inner wall of the waveguide. In this case, provision of zinc sulfide on the inner wall of the waveguide renders the variation in transmission loss mild, permitting the acceptable layer thickness range of the dielectric in the production of the hollow waveguide to be made broader than that for germanium. In the transmission of $CO_2$ laser beam, a zinc sulfide layer thickness around 0.8 $\mu$m provides the minimum transmission loss. The optimal layer thickness varies depending upon the wavelength of the laser beam transmitted. Setting of an optimal layer thickness according to the wavelength of the laser beams transmitted can realize low-loss waveguides in respective wavebands of laser beams without limitation to the transmission of $CO_2$ laser beam.

In general, zinc sulfide or zinc selenide has a low absorption loss over a wide waveband ranging from visible light to far infrared radiation. In particular, no absorption peak appears at 2.94 $\mu$m, 5 $\mu$m, and 10.6 $\mu$m, oscillation wavelengths of Er-YAG laser, CO laser, and $CO_2$ laser which are regarded as important light sources in the infrared region from the practical point of view. Therefore, laser beams in these wavebands can be transmitted with low loss.

In the above hollow waveguide, the light transmitted through the waveguide is mostly propagated through the hollow region. In this case, the amount of the light absorbed into the dielectric layer is so small that light transmission can be performed with low loss, and since the above technique can be applied to a small-diameter waveguide, excellent flexibility can be realized.

Further, zinc sulfide or zinc selenide has high heat resistance because it is an inorganic compound. As described above, the amount of laser energy which is transmitted through the dielectric layer provided on the inner wall of the waveguide is small. Since, however, the absorbed laser energy is entirely converted to thermal energy, the heat resistance is an important property particularly as in the waveguide of the present invention through which high laser energy is transmitted. The thin layer of zinc sulfide or zinc selenide provided as a dielectric layer on the inner wall of the waveguide causes neither heat deformation nor heat decomposition.

Further, a transparent dielectric layer can be easily provided on the inner wall of a metallic hollow waveguide by introducing a solution as a starting compound for zinc sulfide or zinc selenide into a hollow metallic waveguide, discharging the solution from the waveguide, and drying and solidifying the solution. The thickness of the dielectric layer can be controlled with a good accuracy as desired by varying productions conditions, such as the number of repetitions of the steps of filling, discharge, and drying of the solution, the viscosity and concentration of the solution, and the coating speed. Further, this method of making a hollow waveguide according to the present invention does not need any expensive production apparatus, can be applied to the production of waveguides having excellent flexibility and small diameter, and, since the length of the waveguide does not depend upon the apparatus for making the waveguide, can realize an increase in length of the waveguide.

Figure 5:
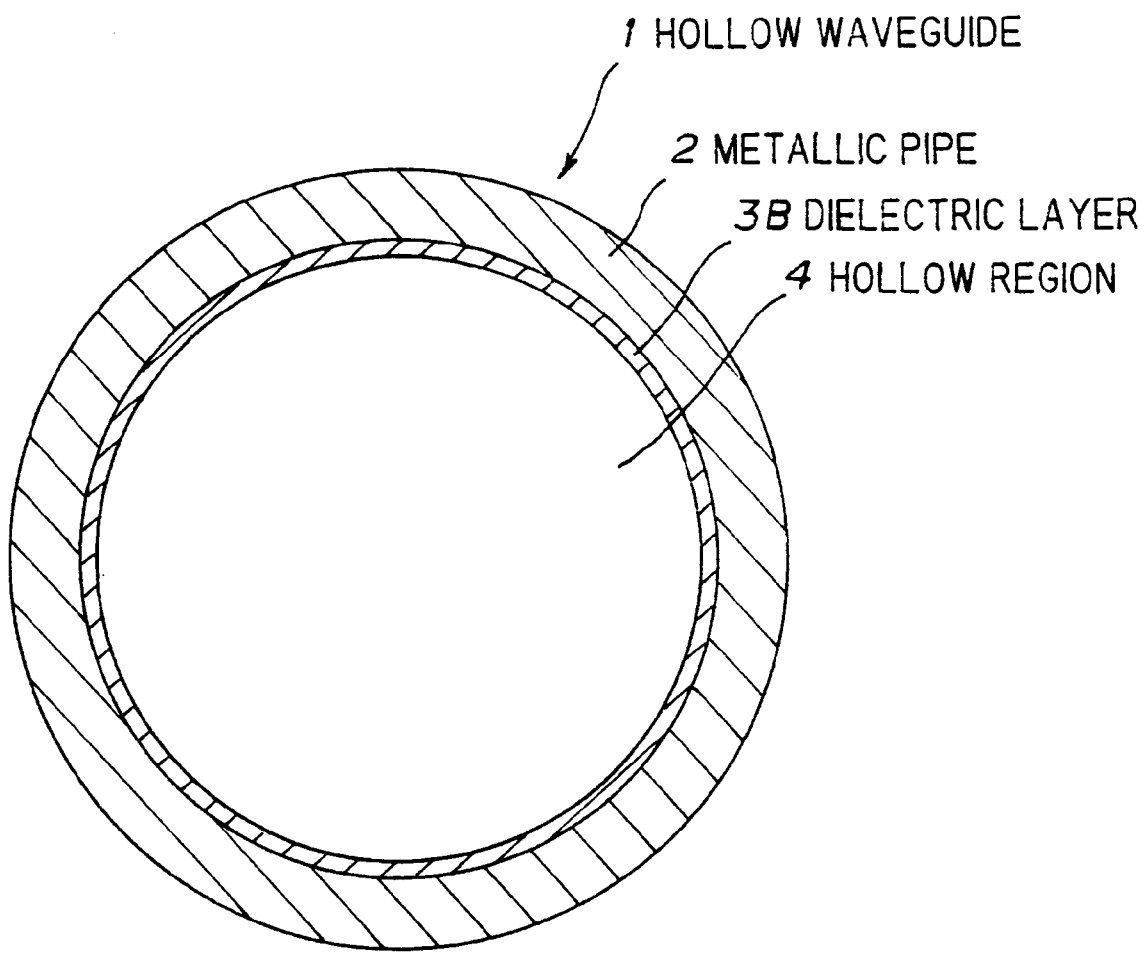
FIG. 5 is an explanatory view showing a hollow waveguide according to a second preferred embodiment of the present invention.

FIG. 5 shows a hollow waveguide 1 according to the second preferred embodiment of the present invention. This hollow waveguide 1 comprises: a metallic pipe 2; a dielectric layer 3B provided on the inner wall of the metallic pipe 2, the dielectric layer 3B formed of a cyclic olefin polymer; and a hollow region 4 provided on the inside of the dielectric layer 3B.

A laser beam, upon entry into the hollow waveguide 1, is repeatedly reflected in the interface of the hollow region 4 and the dielectric layer 3B and in the dielectric layer 3B and the metallic pipe 2, thus permitting the laser beam to be propagated through the hollow waveguide 1. In general, since the metallic material has a large coefficient of absorption for a laser beam transmitted through the waveguide, there is no possibility that the laser energy deeply enters the metallic layer. Therefore, for the metallic layer in contact with the dielectric layer 3B, a thickness greater than that of the skin depth suffices from the optical viewpoint.

The metallic pipe 2 is optically involved in the transmission characteristics and, at the same time, functions to maintain the mechanical strength of the hollow waveguide 1. Regarding the metal in contact with the dielectric layer 3B, the larger the absolute value of the complex index of refraction, the lower the loss. Therefore, for example, use of a metallic pipe 2 made of silver or gold is effective in lowering the loss of the waveguide. It, however, is impractical from the viewpoints of economy and mechanical properties.

Further, a thick-wall metallic pipe, which is inexpensive and has excellent mechanical strength, provided on its inner wall with a metallic thin layer of a metallic material different from the metallic material constituting the pipe may be used as the metallic pipe 2. Pipes satisfying these requirements include phosphor bronze pipes having a high coefficient of thermal conductivity and excellent mechanical bending properties and stainless pipes which are inexpensively available as chemical stable pipes with the surface roughness of the inner wall being small. Gold, silver, or copper, of which the absolute value of the complex index of refraction is particularly large, or molybdenum which is hard and is less likely to be scratched, is favorable as the metallic thin layer to be formed on the inner wall of the metallic pipe.

There are many cyclic olefin polymers which have a low refractive index and are transparent to a wide region from ultraviolet to infrared. According to the second preferred embodiment of the present invention, in particular, a non-crystalline cyclic olefin polymer prepared from norbornene, dicyclopentadiene, or tetracyclododecene is used. Such a cyclic olefin polymer has an inherent absorption peak in the infrared region which, however, discretely appears with respect to the wavelength. Therefore, the wavelengths at the absorption peak aren't coincident with oscillation wavelengths of laser sources, for example, Er-YAG laser, CO laser, and $CO_2$ laser, which are important laser sources from the practical viewpoint.

The cyclic olefin polymer, as compared with germanium, zinc sulfide or the like, has a large coefficient of absorption also in other wavebands than those having an absorption peak inherent in the material. For the hollow waveguide, unlike the solid type optical fiber, the laser energy transmitted mostly focuses on the hollow region 4 where the laser energy to be transmitted is hardly lost, while only a very low proportion of the energy is absorbed into the dielectric layer 3B. Therefore, the influence of very low absorption loss in the dielectric layer 3B on the transmission loss is very small.

As described above, in the metallic hollow waveguide provided on its inner wall with a dielectric, the closer the refractive index of the thin layer of a dielectric provided on the inner wall of the waveguide to $\sqrt{2}$, the lower the transmission loss. The cyclic olefin polymer material has a refractive index of about 1.45 to 1.55 and, hence, can realize a low-loss waveguide and, at the same time, can broaden the acceptable thickness range for the thin layer to be provided on the inner wall of the waveguide, facilitating the production of the waveguide.

The cyclic olefin polymer has better heat resistance than polymethyl methacrylate widely used as an optical polymer, and the grass transition point of polymethyl methacrylate is about 105° C., whereas the glass transition point of the cyclic olefin polymer is about 140° C. As described above, the amount of laser energy which is propagated through the dielectric layer provided on the inner wall of the waveguide is small. Since, however, the absorbed laser energy is entirely converted to thermal energy, the heat resistance is an important property particularly as in the waveguide of the present invention through which high laser energy is transmitted.

The water absorption of the cyclic olefin polymer is not more than 0.01% which is lower than that of polycarbonate and polymethacrylate, not less than 0.2%. Therefore, the cyclic olefin polymer can offer a lower loss in the transmission of an infrared laser beam. In particular, the oscillation wavelength of Er-YAG laser, 2.94 $\mu$m, is coincident with the wavelength of the maximum absorption peak, of a laser beam, derived form water. Therefore, the presence of a very small amount of water results in increased transmission loss of the waveguide.

In the hollow waveguide 1 shown in FIG. 5, a nonmetallic pipe coated with a metallic layer may be used instead of the metallic pipe 2. Particularly preferred nonmetallic pipes include fluororesin pipes and quartz glass pipes. The fluororesin pipes possess excellent flexibility and chemical resistance. On the other hand, the quartz glass pipes possess excellent heat resistance and chemical resistance and, in addition, have very small surface roughness in the inner wall, resulting in lowered transmission loss. The mechanical strength of the glass pipe can be dramatically improved by coating a resin on the external surface of the glass pipe.

As described above, gold, silver, or copper, of which the absolute value of the complex index of refraction is particularly large, or molybdenum which is hard and is less likely to be scratched, is favorable as the metallic layer coated onto the inner wall of the nonmetallic pipe. A single layer of the above metal suffices for satisfactory optical properties. For example, however, interposition of a nickel layer between the nonmetallic pipe and the above metallic layer can enhance the adhesion of the metallic layer to the nonmetallic pipe. The nickel layer can be easily formed by allowing an electroless nickel plating solution to flow into the nonmetallic pipe and discharging the plating solution from the nonmetallic pipe.

According to the second preferred embodiment of the present invention, as with the first preferred embodiment of the present invention, the thickness of the metallic layer coated onto the inner wall of the metallic pipe 2 is not more than 50 $\mu$m. A thickness greater than the skin depth suffices for satisfactory results. When the thickness is excessively large, the adhesion is lowered due to the internal stress of the metallic layer and a difference in coefficient of linear expansion.

The hollow waveguide 1 can transmit therethrough visible light of He—Ne laser or the like in a superimposed state or while switching. This is effective in safely applying an invisible laser beam to an object. Further, a dried gas, such as air, nitrogen, or carbon dioxide gas, may be introduced into and passed through the waveguide. The dried gas prevents the entry of dust or water into the interior of the waveguide and, in addition, cools the waveguide which has generated heat upon absorption of the laser energy. In the medical field, the above gas should be sprayed simultaneously with the laser beam irradiation to the affected part. In this case, the gas may be introduced by utilizing the hollow structure of the waveguide.

Figure 6A:
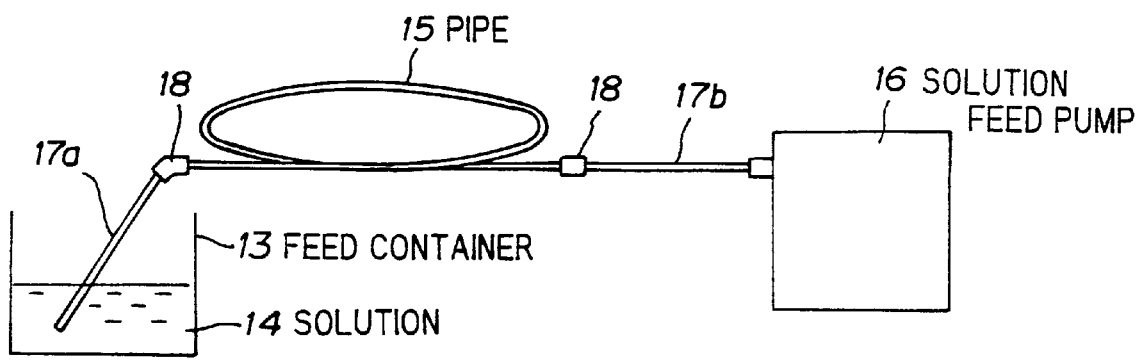
FIG. 6A is an explanatory view showing a coating device for a cyclic olefin polymer used in a second preferred embodiment of the present invention.
Figure 6B:
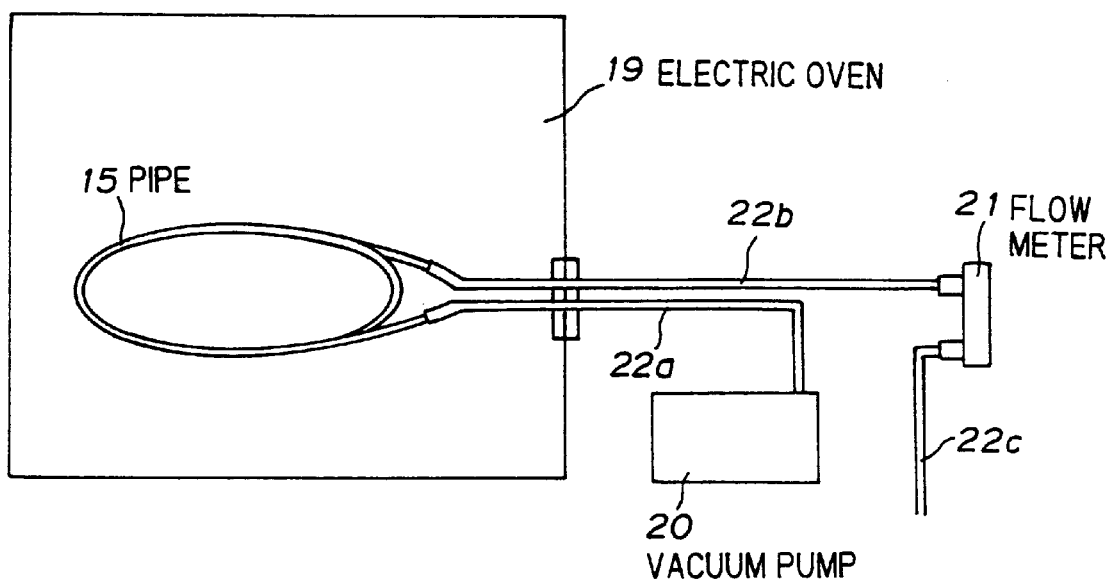
FIG. 6B is an explanatory view showing a drying device for a cyclic olefin polymer used in a second preferred embodiment of the present invention.

FIG. 6 shows an apparatus for making the hollow waveguide 1. This apparatus comprises a device for coating a cyclic olefin polymer shown in FIG. 6(A) and a device for drying the cyclic olefin polymer shown in FIG. 6(B).

The device for coating a cyclic olefin polymer comprises a feed container 13 containing a solution 14 of a noncrystalline cyclic olefin polymer dissolved in mesitylene, a feed pipe 17a connected through a joint 18 to one end of a pipe 15 to be served as a waveguide, a discharge pipe 17b connected through a joint 18 to the other end of the pipe 15, and a solution feed pump 16 connected to the discharge pipe 17b.

The solution 14 is prepared by dissolving a noncrystalline cyclic olefin polymer in mesitylene or cyclohexane, and the concentration (solid content) is set at 8 to 10%. The pipe 15 is a quartz capillary having an inner diameter of 700 $\mu$m and an outer diameter of 800 $\mu$m, has an inner wall coated with a thin layer of silver, and is coiled in order to cope with a demand for an increase in length of the waveguide.

The device for drying the cyclic olefin polymer comprises an electric oven 19 for heat-treating the pipe 15 with the polymer solution introduced thereinto, a vacuum pump 20 for reducing the internal pressure of the pipe 15, a flowmeter 21 for indicating the flow rate of a gas to be introduced into and passed through the pipe 15, and pipings 22a, 22b, and 22c connecting the pipe 15, the vacuum pump 20, and the flowmeter 21 to one another.

The step of providing a dielectric layer on the inner wall of the pipe will be described.

At the outset, the pipe 15 is connected to the feed pipe 17a through the joint 18 and connected to the discharge pipe 17b through the joint 18. The front end of the feed pipe 17a is immersed in the solution 14 contained in the feed container 13, and the discharge pipe 17b is connected to the feed pump 16.

In this state, when the feed pump 16 is put into operation, the solution 14 is sucked and introduced through the feed pipe 17a into the pipe 15 and then discharged from the pipe 15. This permits a given amount of the solution 14 to be coated onto the inner wall of the pipe 15.

The pipe 15 with an inner wall coated with the solution 14 is then placed in the electric oven 19. The vacuum pump 20 is connected to one end of the pipe 15 through the piping 22a, and the flowmeter 21 is connected to the other end of the pipe 15 through the piping 22b. Thereafter, the electric oven 19 is heated to a predetermined temperature to evaporate mesitylene from the solution 14, thereby drying and solidifying the cyclic olefin polymer. Since the boiling point of mesitylene is 165° C., a temperature above the boiling point is used for heating.

A drying gas, such as a nitrogen or helium gas, is introduced into and passed through the pipe 15 so that mesitylene can be fully removed by evaporation. The drying gas is introduced into and passed through the piping 22c connected to the flowmeter 21, and the flow rate thereof is regulated based on a value given by a indicator of the flowmeter 21. The step of coating the solution 14 and the step of drying the coating are repeated until the thickness of the thin layer of a cyclic olefin polymer provided on the inner wall of the pipe 15 reaches a desired one.

When a thin layer of a cyclic olefin polymer having a desired thickness has been provided on the inner wall of the pipe, the temperature of the electric oven 19 is set at 200° C., followed by heating of the pipe 15 for about one hr to fully dry the thin layer.

In the embodiment shown in FIG. 6(A), a feed pump was used for coating the polymer solution. The coating method, however, is not limited to this only. For example, it is also possible to use a method wherein a capillary is immersed in the solution and then pulled up to evenly coat the solution onto the inner wall of the capillary by utilizing the gravity of the solution.

FIG. 7 shows the relationship between the transmission loss and the wavelength for a metallic hollow waveguide comprising a silver layer with a dielectric of a cyclic olefin polymer provided on the inner wall of the silver layer. For comparison, the properties of a silver hollow waveguide with no cyclic olefin polymer layer provided on the inner wall thereof are also shown in FIG. 7. The waveguide has a length of 1 m and an inner diameter of 700 $\mu$m. In the metallic hollow waveguide provided on its inner wall with a dielectric, the thickness of the cyclic olefin polymer layer is about 0.5 $\mu$m. As is apparent from the drawing, the metallic hollow waveguide provided on its inner wall with a dielectric has low transmission loss at a wavelength around 5 $\mu$m, indicating that this waveguide is suitable for transmission of a CO laser beam oscillated at a wavelength of 5.3 $\mu$m. The transmission loss of the metallic hollow waveguide with a dielectric provided on the inner wall thereof depends upon the thickness of the dielectric layer as the inner layer, and the optimal layer thickness is determined by the wavelength of the laser beam transmitted.

When a laser other than the CO laser, for example, an Er-YAG laser, is used as a laser beam source, the thickness of the cyclic olefin polymer layer should be set at about 0.25 $\mu$m. In this case, the minimum loss wavelength of the waveguide is shifted toward the shorter wavelength side and around 2.94 $\mu$m, oscillation wavelength of Er-YAG laser. On the other hand, when transmission of a laser beam having a longer oscillation wavelength, such as a $CO_2$ laser beam having a long oscillation wavelength, is contemplated, the thickness of a cyclic olefin polymer layer as the inner layer should be larger. Thus, proper setting of the thickness of the cyclic olefin polymer layer according to the oscillation wavelength of the laser beam transmitted can realize a low-loss waveguide. The thickness of the cyclic olefin polymer layer can be easily regulated by the solid content, coating speed, number of coatings and the like of the cyclic olefin polymer solution in the production process of the hollow waveguide 1.

The cyclic olefin polymer used in the second preferred embodiment of the present invention causes an inherent absorption loss in the infrared region. As is apparent also from FIG. 7, an absorption peak deemed to be derived from a CH group appears at wavelength around 3.4 $\mu$m. In such a waveband which shows a large absorption peak, provision of a thin layer of a dielectric provide on the inner wall of the waveguide cannot realize reduced transmission loss of the waveguide.

On the other hand, no large absorption peaks appear at 2.94 $\mu$m, 5 $\mu$m, and 10.6 $\mu$m, oscillation wavelengths of Er-YAG laser, CO laser, and $CO_2$ laser which are regarded as important light sources in the infrared region from the practical point of view. Therefore, as compared with the silver hollow waveguide, provision of a cyclic olefin polymer layer as an inner layer can reduce the transmission loss of the waveguide. Thus, proper setting of the thickness of the dielectric layer, as an inner layer, formed of a cyclic olefin polymer layer according to the wavelength can realize a low-loss waveguide over a wide wavelength region from ultraviolet to infrared while avoiding the absorption peak wavelength inherent in the material.

As described above, the light transmitted through the waveguide is mostly propagated through the hollow region. In this case, the amount of the light absorbed into the dielectric layer of a cyclic olefin polymer material is so small that light transmission can be performed with low loss, and application of the above technique to a small-diameter waveguide permits excellent flexibility to be realized in the waveguide.

Further, a dielectric layer of a cyclic olefin polymer can be easily provided on the inner wall of a metallic hollow waveguide by introducing a solution of a cyclic olefin polymer dissolved in a solvent into a hollow metallic waveguide, discharging the solution from the waveguide, and drying and solidifying the solution. The thickness of the dielectric layer can be controlled with a good accuracy as desired by varying productions conditions, such as the number of repetitions of the steps of filling, discharge, and drying, the viscosity of the solution, the solid content, and the coating speed. Further, this method of making a hollow waveguide according to the present invention does not need any expensive production apparatus, can be applied to the production of waveguides having excellent flexibility and small diameter, and, since the length of the waveguide does not depend upon the apparatus for making the waveguide, can realize an increase in length of the waveguide.

As described above, in the hollow waveguide and the method of making the same according to the present invention, provision of a thin layer of a dielectric comprising an inorganic compound or a cyclic olefin polymer on the inner wall of a hollow pipe can realize a hollow waveguide which causes no significant loss in light having a waveband untransmittable by a quartz optical fiber, is suitable for mass production, can be easily produced in an increased length or a reduced diameter, and has excellent long-term reliability.

The invention has been described in detail with particular reference to preferred embodiments, but it will be understood that variations and modifications can be effected within the scope of the invention as set forth in the appended claims.

What is claimed is:

1. A hollow waveguide that causes no significant loss in light having a waveband untransmittable by a quartz optical fiber, said hollow waveguide comprising:

a tubular member constituting a waveguide; and a dielectric provided on an inner wall of the tubular member and transparent to a waveband of light to be transmitted, the dielectric being a coating composed mainly of an inorganic compound prepared by heat-treating a metallic compound solution at a high temperature to dry and solidify the coating and heat-decomposing an organic component of the metallic compound solution.

2. The hollow waveguide according to claim 1, wherein the metallic compound solution comprises a metal alkoxide compound dissolved in and diluted with an alcohol or an ester organic solvent.

3. The hollow waveguide according to claim 1, wherein the dielectric is composed mainly of a metal oxide selected from the group consisting of $SiO_2$, $Al_2O_3$, $TiO_2$, ZnO, MgO, $ZrO_2$, $CeO_2$, $SnO_2$, and $Y_2O_3$, the metal oxide being in a single oxide form or a composite oxide form.

4. The hollow waveguide according to claim 1, wherein the dielectric is composed mainly of zinc sulfide synthesized by a reaction of zinc alkoxide with hydrogen sulfide.

5. The hollow waveguide according to claim 4, wherein the zinc alkoxide comprises zinc dimethoxide, zinc diethoxide, zinc di-n-propoxide, zinc di-n-butoxide, or zinc tetra-n-butoxide and is dissolved by a reaction with an amino alcohol.

6. The hollow waveguide according to claim 1, wherein the dielectric is composed mainly of zinc selenide synthesized by a reaction of zinc alkoxide with hydrogen selenide.

7. The hollow waveguide according to claim 1, wherein the dielectric is composed mainly of zinc sulfide prepared by heat-decomposing a precursor, the precursor having been prepared by mixing zinc chloride with thiourea in an alcohol.

8. The hollow waveguide according to claim 1, wherein the dielectric is composed mainly of zinc selenide prepared by heat-decomposing a precursor, the precursor having been prepared by mixing zinc chloride with selenourea in an alcohol.

9. The hollow waveguide according to claim 1, wherein visible light and infrared light having a wavelength of not less than 2 $\mu$m are allowed to enter a hollow region surrounded by the tubular member in a superimposed state or a state of switching where light that enters is switched between visible light and infrared light.

10. A hollow waveguide for transmitting light having a wavelength of more than about 2 $\mu$m, said hollow waveguide comprising:

a tubular member constituting a waveguide; and a dielectric provided on the inner wall of the tubular member, the dielectric comprising a cyclic olefin polymer transparent to a waveband of light to be transmitted.

11. The hollow waveguide according to claim 10, wherein the cyclic olefin polymer is a noncrystalline cyclic olefin polymer prepared by heat-treating a polymer solution prepared from norbornene, dicyclopentadiene, or tetracyclododecene.

12. A method of making a hollow waveguide, comprising the steps of:

providing a tubular member for constituting a waveguide;

introducing a solution of a dissolved zinc alkoxide into the tubular member to deposit the zinc alkoxide solution onto the whole inner wall of the tubular member;

discharging the extra solution from the interior of the tubular member;

heat-treating the tubular member at a high temperature while introducing hydrogen sulfide gas into the tubular member and passing the hydrogen sulfide gas through the tubular member; and drying and solidifying the solution, deposited on the whole inner wall region, by the heat treatment at a high temperature to form a dielectric layer of zinc sulfide.

13. A method of making a hollow waveguide, comprising the steps of:

providing a tubular member for constituting a waveguide;

introducing a solution of a dissolved zinc alkoxide into the tubular member to deposit the zinc alkoxide solution onto the whole inner wall of the tubular member;

discharging the extra solution from the interior of the tubular member;

heat-treating the tubular member at a high temperature while introducing a hydrogen selenide gas into the tubular member and passing the hydrogen selenide gas through the tubular member; and drying and solidifying the solution, deposited on the whole inner wall region, by the heat treatment at a high temperature to form a dielectric layer of zinc selenide.

14. A method of making a hollow waveguide, comprising the steps of:

providing a tubular member for constituting a waveguide;

introducing a precursor solution, prepared by mixing zinc chloride with thiourea in an alcohol, into the tubular member to deposit the precursor solution onto the whole inner wall of the tubular member;

discharging the extra solution from the interior of the tubular member;

heat-treating the tubular member at a high temperature while introducing a gas into the tubular member and passing the gas through the tubular member; and drying and solidifying the solution, deposited on the whole inner wall region, by the heat treatment at a high temperature to form a dielectric layer of zinc sulfide.

15. A method of making a hollow waveguide, comprising the steps of:

providing a tubular member for constituting a waveguide;

introducing a precursor solution, prepared by mixing zinc chloride with selenourea in an alcohol, into the tubular member to deposit the precursor solution onto the whole inner wall;

discharging the extra solution from the interior of the tubular member;

heat-treating the tubular member at a high temperature while introducing a gas into the tubular member and passing the gas through the tubular member; and drying and solidifying the solution, deposited on the whole inner wall region, by the heat treatment at a high temperature to form a dielectric layer of zinc selenide.

* * * * *